United States Patent [19]

Shackle

[11] 4,025,455
[45] May 24, 1977

[54] CROSS-LINKED HYDROXYPROPYLCELLULOSE MICROCAPSULES AND PROCESS FOR MAKING

[75] Inventor: Dale Richard Shackle, Scottsboro, Ala.

[73] Assignee: The Mead Corporation, Dayton, Ohio

[22] Filed: Apr. 2, 1976

[21] Appl. No.: 673,003

Related U.S. Application Data

[63] Continuation-in-part of Ser. No. 480,956, June 19, 1974, abandoned.

[52] U.S. Cl. .............................. 252/316; 282/27.5; 427/339; 428/307; 428/914
[51] Int. Cl.$^2$ ......................................... B01J 13/02
[58] Field of Search ...................... 252/316; 424/35

[56] References Cited

UNITED STATES PATENTS

| 3,141,792 | 7/1964 | Lachman et al. ................. 424/31 X |
| 3,270,100 | 8/1966 | Jolkovski et al. ....................... 264/4 |
| 3,429,827 | 2/1969 | Ruus ................................... 252/316 |
| 3,449,228 | 6/1969 | Yurcheshen et al. ............. 204/181 |
| 3,464,926 | 9/1969 | Vandegaer et al. ............... 252/316 |
| 3,492,380 | 1/1970 | Santo et al. ............................ 264/4 |
| 3,567,650 | 3/1971 | Bakan ................................. 252/316 |
| 3,575,882 | 4/1971 | Vandegaer et al. ............... 252/316 |
| 3,577,515 | 5/1971 | Vandegaer .......................... 424/32 |
| 3,607,776 | 9/1971 | Santo et al. ........................ 252/316 |
| 3,726,804 | 4/1973 | Matsukawa et al. .............. 252/316 |
| 3,796,669 | 3/1974 | Kiritani et al. .................... 252/316 |
| 3,875,074 | 4/1975 | Vassiliades et al. ............... 252/316 |

Primary Examiner—Richard D. Lovering

[57] ABSTRACT

This invention relates to a process for forming microcapsules comprising the steps of preparing an aqueous solution containing a hydroxypropylcellulose wall forming compound, the hydroxypropylcellulose wall forming compound containing reactive hydroxyl groups and being characterized by having decreasing solubility with increasing temperature in aqueous solution. An oil solution is prepared containing an oil soluble cross-linking agent for the hydroxypropylcellulose wall forming compound in an oil to be encapsulated, the oil soluble cross-linking agent being a polyfunctional isocyanate containing more than one group capable of reacting with hydroxyl groups to provide cross-linkage with the hydroxypropylcellulose wall forming compound. The aqueous solution containing hydroxypropylcellulose is mixed with the oil solution containing the cross-linking agent in a manner such that an emulsion is formed having droplets of the oil solution dispersed in the aqueous solution. The mixture is heated to a temperature of from about 45° C to about 52° C to cause the formation of a precipitate of the hydroxypropylcellulose wall forming compound on the droplets of the oil solution, the precipitate resulting from the interaction of the hydroxypropylcellulose wall forming compound and the polyfunctional isocyanate cross-linking agent to form microcapsule walls. The temperature of the heated mixture is maintained at a temperature and for a time sufficient to permit the microcapsule walls to become substantially oil and water impermeable. This invention also relates to the microcapsules produced by the process of this invention.

12 Claims, No Drawings

CROSS-LINKED HYDROXYPROPYLCELLULOSE MICROCAPSULES AND PROCESS FOR MAKING

CROSS-REFERENCE TO RELATED APPLICATION

This application is a continuation-in-part of commonly assigned, co-pending application U.S. Ser. No. 480,956 filed June 19, 1974, and now abandoned.

BACKGROUND OF THE INVENTION

1. Field of the Invention

This invention relates to microencapsulating processes and the microcapsules produced therefrom.

2. The Prior Art

A method for the production of microcapsules containing oils using coacervation is disclosed in U.S. Pat. No. 2,800,457 (1957) to Green et al. The process described therein involves the coating of oil droplets with a liquid wall of gelatingum arabic colloidal material produced by coacervation. The liquid wall thus formed is hardened by treatment with formaldehyde. It is known that aqueous solutions of hydrophilic colloids such as gelatins or gum arabics can be caused to undergo coacervation by adding to said solutions various substances such as inorganic salts or oppositely charged colloids. The coacervate droplets are known to encase droplets of water-immiscible or slightly water-immiscible liquids and to gel and solidify upon cooling to room temperatures thereby forming liquid droplets encased in a gelatin membrane. After hardening to the gelatin membranes in the normal fashion (such as with formaldehyde) encapsulated suspensions of liquids are obtained which after removal of water could be transfored by known drying methods into free-flowing dry powders. Other known patents teaching coacervation-related processes include:

U.S. Pat. No. 3,244,640 (1966) to Studt et al.
U.S. Pat. No. 3,539,465 (1970) to Hiestand
U.S. Pat. No. 3,567,650 (1971) to Balcan
U.S. Pat. No. 3,594,326 (1971) to Himmel Other patents teaching processes of producing oil containing microcapsules include: U.S. Pat. No. 3,242,051 (1966) to Hiestand teaching phase separation, U.S. Pat. No. 3,432,327 (1969) to Masao Kan et al teaching interfacial reaction between components of a dispersed phase and components of a continuos phase, U.S. Pat. No. 3,779,941 (1973) to Powell teaching the interfacial reaction of a water soluble and oil soluble resin, and U.S. Pat. No. 3,016,308 (1962) to Macauley teaching a method of producing microcapsules by spray drying an emulsion which contains a film-forming substance in the continuous phase.

All of the above described processes of microencapsulation suffer from one or more of the following disadvantages, particularly if commerical production of the resulting microcapsules, for use in aqueous coating compositions, is desired. Either the process requires a series of complicated steps including special apparatus and in most instances coacervation, or the microcapsules produced by the process cannot be conveniently used in aqueous coating compositions. In some of the above patented processes, most notably those involving interfacial polymerization, the wall thickness is limited because of the need for diffusion of at least one of the reactants through the microcapsule wall. The use of coacervation in a microencapsulation process suffers from other disadvantages in that the microcapsule product must be separated from the liquid phase and also that coacervation results in the production of clusters and aggregates of microcapsules as opposed to the more desirable production of discrete individual microcapsules.

The process of this invention includes a number of advantages not found in prior art methods. The materials used are relatively inexpensive and are readily available in commercial quantities. The process requires no complicated steps, simply emulsification of the desired droplet solution in the solution containing the wall forming compound and then temperature adjustment to precipitate the wall forming compound and to form the microcapsule wall. Because of the non-sticky nature of the wall forming compounds, microencapsultion of single droplets of oil is easily obtained, as opposed to the clusters and aggregates generally obtained by coacervation. The wall thickness of the microcapsules is not limited as in some prior art processes since the microcapsule wall is formed by precipitation of the wall forming compound and by the interaction of the wall forming compound wtih the cross-linking agent. The wall thickness can be controlled by the oil droplet size and relative amounts of wall forming compound and oil to be microencapsulated.

By the process of this invention, dispersions of approximately 50% microcapsules have been produced as compared to the more usual 25% obtained by prior art methods involving coacervation. Thus, the dispersion of microcapsulation can be used without dewartering in coating composition where a high solids content is desirable.

Other patents considered relevant although inferior to the product and processes of this disclosure are:

U.S. Pat. No. 3,141,792 (1964) to Lachman et al.
U.S. Pat. No. 3,449,228 (1969) to Yurcheshen et al.
U.S. Pat. No. 3,779,942 (1973) to Bolles
U.S. Pat. No. 3,875,074 (1975) to Vassiliades et al.

SUMMARY OF THE INVENTION

This invention relates to a process for forming microcapsules comprising the steps of preparing an aqueous solution containing a hydroxypropylcellulose wall forming compound, the hydroxypropylcellulose wall forming compound containing reactive hyroxyl groups and being characterized having decreasing solubility with increasing temperature in aqueous solution. An oil solution is prepared containing an oil soluble cross-linking agent for the hydroxypropylcellulose wall forming compound in an oil to be encapsulated, the oil soluble cross-linking agent being a polyfunctional isocyanate containing more than one group capable of reacting with hydroxyl groups to provide cross-linkage with the hydroxypropylcellulose wall forming compound. The aqueous solution containing hydroxypropylcellulose is mixed with the oil solution containing a cross-linking agent in a manner such that an emulsion is formed having droplets of the oil solution dispursed in the aqueous solution. The mixture is heated to a temperature of from about 45° C to about 52° C to cause the formation of a precipitate of the hydroxypropylcellulose wall forming compound on the droplets of the oil solution, the precipitate resulting from the interaction of the hydroxypropylcellulose wall forming compound and the polyfunctional isocyanate cross-linking agent to form microcapsule walls. The temperature of the heated mixture is maintained at a temperature and for a time sufficient to permit the microcapsule walls to become substantially oil and water imperneable. This invention also related to the microcapsules produced by the process of this invention.

DETAILED DESCRIPTION OF THE PREFERRED EMBODIMENT

The process of this invention includes the steps of preparing an aqueous solution containing a hydroxypropylcellulose wall forming compound, preparing an oil solution containing a cross-linkage agent for the hydroxypropylcellulose wall forming compound, preferably a polyfunctional isocyanate, mixing the aqueous and oil solutions until an emulsion of droplets of the oil solution is formed in the aqueous solution, heating the emulsion to a temperature above the precipitation temperature of the hydroxypropylcellulose wall forming compound, and maintaining the temperature above the precipitation temperature until the resulting microcapsule walls are substantially oil and water impermeable.

In the preferred embodiment of this invention, a second cross-linking agent for the hydroxypropylcellulose wall forming compound is added to the first solution prior to heating the emulsion to a temperature above the precipitating temperature of the hydroxypropylcellulose wall forming compound. The second cross-linking agent further promotes wall formation when the appropriate precipitating temperature has been reached. For purposes of this application, the term hydroxypropylcellulose wall forming compound shall include hydroxypropylcellulose and other wall forming compounds of which hydroxypropylcellulose forms a substantial portion. In addition, for purposes of this application, hydroxypropylcellulose will sometimes be referred to as HPC.

The first solution is prepared by combining a HPC wall forming compound with a first solvent. The wall forming compound is characterized by having reactive hydroxyl groups in addition to specific solubility characteristics. More particularly, the wall forming compound must have decreasing solubility with increasing temperature and must result in the formation of a precipitate. The preferred first solvent for the first solution is water.

Hydroxypropylcellulose is a film-forming cellulosic ether polymer soluble in cold water, but insoluble in hot water. The commercially available polymers have a molar substitution (M.S.) of about three to five hydroxypropyl units to each cellulose unit. A particular group of hydroxypropylcelluloses are manufactured by Hercules. Inc. and sold by them under the trade name of Klucel. These polymers precipitate out of a water solution at a temperature of about 45° C and preferably at from about 45° C to about 52° C as a finely divided solid precipitate. The polymers are available in a variety of viscosity types. The lower viscosity types, G, J, L and E are necessary for use in this invention. Of these, type L having a molecular weight of approximately 75,000 and an M. S. of approximately three has been found to be particularly useful.

The aqueous phase, containing HPC, can be prepared by dissolving the PHC in water at a temperature below 40° C, preferably at from about 10° C – 30° C. To facilitate the preparation, the HPC can be dispersed in the water at 45° C or above prior to lowering the temperature of the dispersion to below 40° C to dissolve the HPC. The concentration of the HPC is not critical, but would depend on the ratio of aqueous phase to the material to be encapsulated, the size of the desired second solution droplets and the desired thickness of the microcapsular walls. Aqueous solutions containing from about 0.2% to about 6%, preferably 1.5% to 4%, of HPC are used in the preparation of the aqueous phase.

The oil solution is prepared by combining an oil soluble cross-linking agent for the HPC wall forming compound with a second solvent. It is preferable that the first solvent, containing the HPC wall forming compound, and the second solvent, containing the oil soluble cross-linking agent, be immiscible in each other. In the preferred embodiment of this invention the first solvent is water and the second solvent is an oil and most preferably monoisopropylbiphenyl (hereinafter sometimes referred to as MIPB). For purposes of this application the second solution shall hereinafter sometimes be referred to as the "oil phase".

The oil solution can be prepared by adding and stirring the oil soluble cross-linking agent to the second solvent while the mixture is coal, preferably below 15° C. The choice of solvent depends largely on the final utilization of the microcapsules. If, for example, the microcapsules are to be used in preparing pressure sensitive paper, the second solvent should preferably be MIPB, chlorinated biphenyls, alkylnaphthalenes, kerosene, petroleum naphtha or mixtures thereof.

The oil soluble cross-linking agents ued in the preferred embodiment of this invention for forming the oil phase are those containing more than one group capable of reacting with hydroxyl groups thus providing the desired cross-linkage with the HPC wall forming compound. The cross-linking agents must be soluble in the oil phase and not reactable with the oil solvent or interfere with the desired function of any component of the oil phase. For example, if an oil solution of a color precursor is desired to be encapsulated and coated on paper, the cross-linking agent should not interfere with the color producing function of the resultant paper. In general polyfunctional isocyanates, acyl chlorides, phosphoryl chlorides, sulfonyl chlorides, alkylene bischloroformates or mixtures thereof can be used. If microcapsules for use in the preparation of pressure sensitive papers are desired, the polyfunctional isocyanates or prepolymers containing more than one reactive isocyanate groups are preferred. The concentration of the oil soluble cross-linking agent in the oil phase is not critical. The degree of cross-linking desired is dependent on the end utilization of the microcapsules. For example, if the microcapsules are to be incorporated into an aqueous coating composition, sufficient reactive groups must be present to react with available hydroxyl groups of the wall forming compound to render the wall forming compound water insoluble. It has, however, been shown that the superior microcapsules formed by the process of this invention are a product of the use of HPC and not the particular oil soluble cross-linking agent. In particular, any of the cross-linking agents exhibiting the above recited characteristics can be used in combination with HPC to produce the desired microcapsules.

Emulsification of the oil phase in the aqueous phase can be accomplished by adding the oil phase to the aqueous phase with vigorous mixing. Mixing may be stirring, shaking or milling. During the mixing operation, the temperature of the mixture must be kept below the temperature at which the HPC wall forming compound precipitates A small amount of an emulsifier, such as about 0.25% by weight Turkey Red Oil (sulfonated caster oil) can be added to the aqueous phase prior to mixing. However, they hydroxypropylcellulose acts as an emulsifier and an acceptable dispersion of droplets can be obtained in the absence of an additional emulsifier. Droplet sizes of about 1 micron to about 100 microns can be produced.

After the desired droplet size is obtained, the mixed emulsion is heated with mild agitation to a temperature above the precipitation temperature of the HPC wall forming compound. The wall forming compound precipitates on the droplets to form microcapsule walls. The temperature increase initiates cross-linking of the HPC wall forming compound with the oil soluble cross-linking agent. The temperature can be maintained with continued agitation of the mixture of a sustained period of time, preferably more than about 1 hour, and most preferably 3 to 16 hours, if microcapsules of low oil and water permeability are desired. However, longer periods do not appear to be detrimental. The exact temperature is not critical so long as the precipitation temperature of the HPC wall forming compound is reached. Satisfactory microcapsules may be made using hydroxypropylcellulose where a temperature of at least 45° C, preferably 45° C to 52° C, can be maintained for a period of 1 to 16 hours.

In the preferred form of this invention, a minor amount, up to about 25% based on the weight of the wall forming compound, preferably about 10%, of a water soluble cross-linking agent is added to the aqueous phase either before, during or after the emulsifying step. The water soluble cross-linking agents may be dimethylolurea, a polyfunctional aziridine, stearatochromyl chloride complex, methoxymethylmelamine, melamine-formaldehyde resin prepolymers and urea-formaldehyde resin prepolymers.

Microcapsules produced according to the process disclosed herein without the addition of a water soluble cross-linking agent to the aqueous solution of the wall forming compound have been used in the preparation of pressure sensitive transfer papers. Such papers can be used in combination with pressure sensitive receptor papers containing phenolic resins, such as those papers manufactured by the methods of U.S. Pat. Nos. 3,455,721 (1960) to Phillips et al. and 3,653,945 (1972) to Davis et al.

The following examples illustrate the invention as it applies to the preparation of microcapsules containing oil solutions of color precursors suitable for use in pressure sensitive papers. The method can be applied to the production of microcapsules containing other oily substances where the function of the oil is not impaired by the components of the emulsion.

The following is a list of cross-linking agents used in the examples.

| Trademark and Source | Chemical Description |
|---|---|
| A. Oil Soluble | |
| Coronate HL - Nippon Polyurethene Co. | 75% solution in ethyl acetate of hexamethylene diisocyanate-trimethylopropane prepolyer in 3 to 1 molar ratio. |
| Conap CP-6242 - Conap, Inc. | 80% solution in ethyl acetate of a prepolymer of tolylene diisocyanate-dipropylene glycol in 2 to 1 molar ratio. |
| Desmodur N-100 - Mobay Chemical Co. | A liquid biuret made by reacting hexamethylene diisocyanate with water in 3 to 1 molar ratio. |
| Mondur CB - 75 - Mobay Chemical Co. | 75% solution in ethyl acetate of a prepolymer of tolylene diisocyanate and trimethylolpropane. |
| Mondur MRS - Mobay Chemical Co. | A polymethylene polyphenylisocyanate. |
| B. Water Soluble | |
| Cymel 301 - American Cyanamid Co. | Hexamethoxymethylmelamine. |
| Cymel 370 - American Cyanamid Co. | A methylated melamine resin. |
| Uformite MM-83 - Rohm & Haas Co. | A methoxymethylmelamine resin. |
| Ionac PFAZ-300 - Ionac Chemical Co. | A polyfunctional aziridine. |

EXAMPLE 1

An oil phase (MIPB solution) was prepared by dissolving 7 grams of crystal violet lactone, 0.9 grams of 3,3-bis(1'-ethyl-2'methylindol-3-yl)phthalide, 1.8 grams of 3-N,N-diethyl-amino-7-(N,N-dibenzylamino)-fluoran, and 2.9 grams of 3-N,N-diethylamino-6,8-dimethylfluoran, all as color precursors in 190 ml. of MIPB at 85° C. This oil phase was then cooled to 15° C. An aqueous phase was prepared comprising 11 grams of Klucel L dissolved in 400 ml. of room temperature water. 1 gram Cymel 301 cross-linking agent and 1 gram of Turkey Red Oil emulsifier were added to the aqueous phase and the pH was adjusted to 4 with 16% acetic acid. To the oil phase, which had been cooled to 15° C, 7.5 grams of Desmodur N-100 oil soluble cross-linking agent and 6 grams of Mondur MRS cross-linking agent were added. This solution in turn was added to the aqueous phase and mixed in a Sunbeam blender. The mixing was continued for 3 minutes until an emulsion was formed and the mixture was then stirred at 50° C for 16 hours. The pH was then adjusted to 7 with 10% NaOH. Microcapsules so prepared were coated on paper and the paper was used as the CB part of a carbonless copy paper system.

EXAMPLE 2

An oil phase was prepared as in Example 1 using 150 mls. instead of 190 mls. of MIPB. An aqueous phase was prepared comprising 11 grams of Klucel L dissolved in 400 ml. of room temperature water. 2 grams of Ionac PEAZ-300 cross-linking agent and 1 gram of Turkey Red Oil emulsifier were added to the aqueous solution. To the MIPB solution which had been cooled to 15° C, 10 grams of Desmodur N-100 and 3.5 grams of Mondur MRS both cross-linking agents, were added. This solution in turn was added to the aqueous phase and mixed in a Sunbeam blender. The mixing emulsification was continued for 3 minutes resulting in the formation of an emulsion and the mixture was then irred at 50° C for 16 hours. The pH was then adjusted to 7 with 10% NaOH. Microcapsules so prepared were coated on paper and the paper worked well as the CB part of the carbonless copy paper system.

EXAMPLE 3

An oil phase was prepared comprising 10 grams of crystal violet lactone dissolved in 150 ml. of MIPB which had been warmed to 85° C. An aqueous phase was prepared comprising 11 grams of Klucel L dissolved in 585 ml. of water, 1.25 grams of Cymel 370 cross-linking agent and 3 grams of Turkey Red Oil emulsifier. 6 grams of phenylphosphonic dichloride (Aldrich Chemical Co.) were added to the oil phase, which had been cooled to 15° C. The oil phase was in turn added to the aqueous phase in a Sunbeam blender where blending was continued until an emulsion was formed. The emulsification blending was continued for 3 minutes at which time the mixture was heated to 50° C. The pH was adjusted slowly with 15% NaOH until the pH was approximately 8. The microcapsules were stirred at 50° C for 16 hours to promote cross-linking. Microcapsules so produced were coated on paper and then the paper was satisfactorily used as the CB part of a carbonless copy paper form.

EXAMPLE 4

Example 3 was repeated with the following changes. .9 grams of succinoyl chloride (Polysciences, Inc.) were added to the oil phase in place of the phenylphosphonic dichloride as the cross-linking agent. 485 ml. of water were used to dissolve the Klucel and 1 gram of Turkey Red Oil was used. The results were comparable to those of Example 7.

EXAMPLE 5

An oil phase was prepared as in Example 1. An aqueous phase was prepared comprising 11 grams of Klucel L dissolved in 285 ml. of room temperature water. 1.25 grams of Cymel 370 were added to the aqueous phase. To the oil phase, which had been cooled to 15° C were added 10 grams of Desmodur N-100, 0.2 grams of catalyst (stannous octoate) and 3.5 grams of Mondur MRS. The oil phase was then added to the aqueous phase accompanied by mixing in a Sunbeam blender at speed 6 until emulsification occurred. The emulsification was continued for 3 minutes and the mixture was heated to 50° C and stirred at that temperature for 16 hours. Microcapsules so prepared were coated on paper and the paper performed well as the CB part of a carbonless copy system.

As used herein, the typewriter intensity is a contrast ratio and is equal to 100 times the ratio for the reflectance of a printed character divided by the background reflectance. A typewrite intensity value of 100 indicates not discernible print and a lower value indicates a more intense print. Specifically, a coated test paper and standard reactant sheet made in accordance with the procedures disclosed in U.S. Pat. No. 3,653,945 (1972) to Davis were placed with the coated sides together and a series of close-spaced characters were typed on the test paper. Reflectance readings were then taken of the background and also the printed characters transferred to the reactant sheet and the contrast ratio was calculated.

Permeability as herein used is expressed as a percentage figure and is actually 100 times the ratio of the quantity of dye obtained by extraction of the capsules by the oil of the internal phase to the total quantity of dye obtained by this extraction plus that obtained by extraction of the microcapsules with a material which destroys the capsule wall. In each case, the color of the dye was developed by stannic chloride and the quantity of dye was determined spectrophotometrically.

What is claimed is:
1. A process for forming microcapsules comprising the steps of:
   a. preparing an aqueous solution containing a hydroxypropylcellulose wall forming compound, said hydroxypropylcellulose wall forming compound containing reactive hydroxyl groups and being characterized by having decreasing solubility with increasing temperature in aqueous solution;
   b. preparing an oil solution containing an oil soluble cross-linking agent for said hydroxypropylcellulose wall forming compound in an oil to be encapsulated, said oil soluble cross-linking agent being a polyfunctional isocyanate, containing more than one group capable of reacting with hydroxyl groups to provide cross-linkage with said hydroxypropylcellulose wall forming compound;
   c. mixing said aqueous solution with said oil solution in a manner such that an emulsion is formed having droplets of said oil solution dispersed in said aqueous solution;
   d. heating said mixture to a temperature of from about 45° C to about 52° C to cause the formation of a precipitate of said hydroxypropylcellulose wall forming compound on said droplets of said oil solution, said precipitate resulting from the interaction of said precipitate resulting from the interaction of said hydroxypropylcellulose wall forming compound and said oil soluble, polyfunctional isocyanate cross-linking agent to form microcapsule walls; and
   e. maintaining the temperature of said heated mixture at temperature and for a time sufficient to permit said microcapsule walls to become substantially oil and water impermeable.

2. The process of claim 1 further comprising addition of a water soluble cross-linking agent to said aqueous solution, wherein said water soluble cross-linking agent is selected from the group consisting of: dimethylolurea, polyfunctional chloride complex, methyoxymethylmelamine, melamine-formaldehyde resin prepolymers, urea-formaldehyde resin prepolymers, and mixtures thereof.

3. The process of claim 1 wherein an emulsifier is added to said aqueous solution.

4. The process of claim 3 wherein said emulsifier is sulfonated caster oil.

5. The process of claim 1 wherein said oil solution contains a color precursor.

6. A process for forming microcapsules comprising the steps of:
   a. preparing an aqueous solution, said aqueous solution including:
      i. a hydroxypropylcellulose wall forming compound, said hydroxypropylcellulose wall forming compound containing reactive hydroxyl groups and being characterized by having decreasing solubility with increasing temperature in aqueous solution,
      ii. A water soluble cross-linking agent wherein said water soluble cross-linking agent is selected from the group consisting of: dimethylolurea, polyfunctional aziridines, stearatochromyl chloride complex, methoxymethylmelamine, melamine-formaldehyde and mixtures thereof, and iii. an emulsifier;

b. preparing an oil solution, said oil solution including:

i. an oil soluble polyfunctional isocyanate cross-linking agent for said hydroxypropylcellulose wall forming compound; said oil soluble polyfunctional isocyanate cross-linking agent containing more than one group capable of reacting with hydroxyl groups to provide cross-linkage with said hydroxypropylcellulose wall forming compound, and ii. a color precursor to be encapsulated;

c. mixing said aqueous solution with said oil solution in a manner such that an emulsion is formed having droplets of said oil solution dispersed in said aqueous solution;

d. heating said emulsion to a temperature of from about 45° C to about 52° C to cause precipitation of said hydroxypropylcellulose wall forming compound on said droplets of said oil solution, said precipitation resulting in the interaction of said hydroxypropylcellulose wall forming compound and said oil soluble polyfunctional isocyanate cross-linking agent to form microcapsule walls; and e. maintaining the temperature of said heated emulsion at from about 45° C to about 52° C for longer than about 1 hour to permit said microcapsule walls to become substantially oil and water impermeable.

7. The process of claim 6 wherein said emulsifier is sulfonated castor oil.

8. A process for forming microcapsules comprising the steps of:

a. preparing an aqueous solution, said aqueous solution including:

i. a hydroxypropylcellulose wall forming compound, said hydroxypropylcellulose wall forming compound containing reactive hydroxyl groups and being characterized by having decreasing solubility with increasing temperature in aqueous solution;

ii. a water soluble cross-linking agent selected from the group consisting of: dimethylolurea, polyfunctional aziridines, steartochromyl chloride complex, methoxymethyl melamine, melamine-formaldehyde and mixtures thereof; and iii. a sulfonated castor oil emulsifier;

b. preparing an oil solution, said oil solution including:

i. an oil soluble cross-linking agent for said hydroxypropylcellulose wall forming compound, said oil soluble cross-linking agent being a polyfunctional isocyanates, and ii. a color precursor to be encapsulated;

c. mixing said aqueous solution with said oil solution in a manner such that an emulsion is formed having droplets of said oil solution dispersed in said aqueous solution;

d. heating said emulsion to a temperature of from about 45° C to about 52° C to cause precipitation of said hydroxypropylcellulose wall forming compound on said droplets of said oil solution, said precipitation resulting in the interaction of said hydroxypropyl-cellulose wall forming compound and said cross-linking agent to form microcapsule walls; and e. maintaining the temperature of said heated emulsion at from about 45° C to about 52° C for longer than about 1 hour to permit said microcapsule walls to become substantially oil and water impermeable.

9. A microcapsule comprising:

a. a nuclear solution, said nuclear solution including an oil solvent, and b. a microcapsules wall encapsulating said nuclear solution, said microcapsules wall comprising hydroxypropylcellulose cross-linked with oil soluble polyfunctional isocyanate, said microcapsule wall being substantially oil and water impermeable 10. The microcapsule of claim 9 wherein said microcapsule wall further comprises the reaction product of a water soluble cross-linking agent reacted with said hydroxypropylcellulose, wherein said water soluble cross-linking agent is selected from the group consisting of: dimethylolurea, polyfunctional aziridines, stearatochromyl chloride complex, methoxymethylmelamine, melamine-formaldehyde resin prepolymers, unreaformaldehyde resin prepolymers and mixtures thereof.

11. The microcapsules of claim 9 wherein said nuclear liquid further includes a marking oil containing a color precursor.

12. A microcapsule for use in coatings of self-contained type paper products comprising:

a nuclear solution, said nuclear solution including:

i. an oil solvent, ii. a color precursor; and b. a microcapsule wall encapsulating said nuclear solution, said microcapsule wall comprising the reaction product of said oil-soluble, polyfunctional isocyanate cross-linking agent and a water soluble cross-linking agent both reacted with hydroxypropylcellulose, said water soluble cross-linking agent being selected from the group consisting of: dimethylolurea, polyfunctional aziridines, stearatochromyl chloride complex, methoxymethylmelamine, melamine-formaldehyde resin prepolymers, urea-formaldehyde resin prepolymers and mixtures thereof, said microcapsule wall being substantially oil and water impermeable.

* * * * *